US010805432B2

(12) United States Patent  
Bifulco et al.

(10) Patent No.: US 10,805,432 B2  
(45) Date of Patent: Oct. 13, 2020

(54) METHOD AND SYSTEM FOR ACCELERATION OF TCP CONNECTION ESTABLISHMENT

(71) Applicant: NEC Laboratories Europe GmbH, Heidelberg (DE)

(72) Inventors: Roberto Bifulco, Heidelberg (DE); Fabian Schneider, Darmstadt (DE)

(73) Assignee: NEC CORPORATION, Tokyo (JP)

(*) Notice: Subject to any disclaimer, the term of this patent is extended or adjusted under 35 U.S.C. 154(b) by 62 days.

(21) Appl. No.: 16/340,700

(22) PCT Filed: Oct. 12, 2016

(86) PCT No.: PCT/EP2016/074496  
§ 371 (c)(1),  
(2) Date: Apr. 10, 2019

(87) PCT Pub. No.: WO2018/068848  
PCT Pub. Date: Apr. 19, 2018

(65) Prior Publication Data  
US 2019/0320046 A1 Oct. 17, 2019

(51) Int. Cl.  
*H04L 29/06* (2006.01)  
*H04L 12/947* (2013.01)  
*H04L 12/931* (2013.01)

(52) U.S. Cl.  
CPC ...... *H04L 69/163* (2013.01); *H04L 29/06095* (2013.01); *H04L 29/06115* (2013.01);  
(Continued)

(58) Field of Classification Search  
CPC ....... H04L 29/06095–06156; H04L 29/06326; H04L 29/08585; H04L 49/70; H04L 69/16–166; H04L 69/22  
See application file for complete search history.

(56) References Cited

U.S. PATENT DOCUMENTS 8,180,902 B1 5/2012 Day et al.  
8,489,670 B1 7/2013 Fletcher et al.  
(Continued)

FOREIGN PATENT DOCUMENTS

CN 103491065 A 1/2014  
JP 2014003459 A 1/2014  
WO 2015131929 A1 9/2015

OTHER PUBLICATIONS

Giuseppe Siracusano et al: "On-the-Fly TCP Acceleration with Miniproxy", Arxiv.Org, Cornell University Library, 201 Olin Library Cornell University Ithaca, NY 14853, May 20, 2016 (May 20, 2016), XP080702448, p. 4.  
(Continued)

*Primary Examiner* — Brendan Y Higa  
(74) *Attorney, Agent, or Firm* — Leydig, Voit & Mayer, Ltd.

(57) ABSTRACT

A method for acceleration of TCP connection establishment between a client and a server in a network includes deploying at least one stateful switch with packet generation capabilities in the network, and configuring the at least one stateful switch to receive a TCP SYN segment from the client, generate a sequence number in a manner coordinated with the server, answer, on behalf of the server, the TCP SYN segment received from the client with a corresponding SYN ACK segment containing the sequence number, forward the TCP SYN segment received from the client to the server, and act as a forwarding element for segments exchanged between the client and the server once a TCP connection is established such that no state relating to the TCP connection is held by the at least one stateful switch.

15 Claims, 5 Drawing Sheets

(52) U.S. Cl.
CPC ............ *H04L 49/252* (2013.01); *H04L 49/70* (2013.01); *H04L 69/22* (2013.01)

(56) References Cited

U.S. PATENT DOCUMENTS

| | | | |
|---|---|---|---|
| 8,806,011 B1* | 8/2014 | Graham-Cumming | .................... H04L 63/1458 709/225 |
| 9,602,330 B1* | 3/2017 | Dickinson | ................ H04L 69/16 |
| 2004/0008681 A1* | 1/2004 | Govindarajan | ......... H04L 29/06 370/394 |
| 2006/0047839 A1* | 3/2006 | Tate | ...................... H04L 69/165 709/230 |
| 2006/0190612 A1* | 8/2006 | Kahol | .................... H04L 69/16 709/230 |
| 2007/0192845 A1* | 8/2007 | Lankheim | ............... H04L 67/16 726/12 |
| 2007/0280273 A1 | 12/2007 | Yun et al. | |
| 2008/0244085 A1* | 10/2008 | Li | ........................... H04L 69/16 709/237 |
| 2013/0336213 A1 | 12/2013 | Mimura et al. | |
| 2016/0119288 A1* | 4/2016 | Ardeli | ................. H04L 63/0227 726/12 |
| 2016/0197823 A1 | 7/2016 | Sreeramoju | |
| 2016/0218960 A1 | 7/2016 | Sundarababu et al. | |
| 2017/0142216 A1* | 5/2017 | Hinde | .................. H04L 69/163 |
| 2019/0320046 A1* | 10/2019 | Bifulco | ................ H04L 69/161 |

OTHER PUBLICATIONS

Abdelmoniem Ahmed et al: "Incast-Aware Switch-Assisted TCP Congestion Control for Data Centers", 2015 IEEE Global Communications Conference (Globecom), IEEE, Dec. 6, 2015 (Dec. 6, 2015), pp. 1-6, XP032872733.

Seungwon Shin et al: "Avant-Guard", Computer & Communications Security, ACM, 2 Penn Plaza, Suite 701 Newyork NY 10121-0701 USA, Nov. 4, 2013 (Nov. 4, 2013), pp. 413-424, XP058034060.

Yamaguchi, Ichiro et al. "Efficient Firewall Traversal Implementation using TCP splicing," Technical Report of the Institute of Electronics, Information and Communication Engineers, Japan, Jan. 27, 2008, vol. 107 No. 448, p. 39-43.

* cited by examiner

METHOD AND SYSTEM FOR ACCELERATION OF TCP CONNECTION ESTABLISHMENT

CROSS REFERENCE TO RELATED APPLICATIONS

This application is a U.S. National Stage Application under 35 U.S.C. § 371 of International Application No. PCT/EP2016/074496 filed on Oct. 12, 2016. The International Application was published in English on Apr. 19, 2018 as WO 2018/068848 A1 under PCT Article 21(2).

FIELD

The present invention relates to a method and a system for acceleration of TCP connection establishment between a client and a server in a network.

BACKGROUND

Short TCP flows, i.e. flows that terminate a few round trip times (RTT) after establishment of the TCP session, are the prevalent flows in today's web services. For these TCP flows, the time required for TCP session establishment, also called three-way handshake, can take a considerable part of the overall connection time, as described in Sivasankar Radhakrishnan, Yuchung Cheng, Jerry Chu, Arvind Jain, and Barath Raghavan: "TCP Fast Open", in Proceedings of the 7th International Conference on emerging Networking EXperiments and Technologies (CoNEXT '11), ACM, New York, N.Y., USA, Article 21. Furthermore, the time required for TCP session establishment is dependent on the RTT between the two parties involved in the communication (generally referred to as client and server), since it requires three TCP segments to travel between the two parties, in any case.

In the state of the art, the problem has been addressed by deploying a TCP proxy close to the TCP client of the connection (i.e., the initiator of the TCP connection), as described in Abhinav Pathak, Y. Angela Wang, Cheng Huang, Albert Greenberg, Y. Charlie Hu, Randy Kern, Jin Li, and Keith W. Ross: "Measuring and evaluating TCP splitting for cloud services", in Proceedings of the 11th International Conference on Passive and Active Measurement (PAM '10), Arvind Krishnamurthy and Bernhard Plattner (Eds.). Springer-Verlag, Berlin, Heidelberg, 41-50. The client establishes a new connection with the proxy. In principle, such establishment is a fast operation that guarantees short network delays due to the proximity of the client to the proxy. However, the solution comes along with the disadvantage that the proxy has a permanent, proactively established connection towards the TCP connection's destination server.

A second way of achieving a reduction of the time required for TCP connection establishment is by deploying a TCP proxy that provides early replies to the TCP segments sent for the connection establishment. If the proxy is on the path between the client and the server, ideally in the middle of the path delay-wise, then the connection is effectively accelerated. This technique requires the proxy to reply to TCP SYN and TCP SYN ACK segments as soon as they are received. Also, the proxy should forward the TCP SYN as soon as possible to the TCP destination server. The details of the approach are described in Giuseppe Siracusano, Roberto Bifulco, Simon Kuenzer, Stefano Salsano, Nicola Blefari Melazzi, Felipe Huici: "On-the-Fly TCP Acceleration with Miniproxy", in ACM SIGCOMM HotMiddlebox, 2016, and in Sameer Ladiwala, Ramaswamy Ramaswamy, and Tilman Wolf: "Transparent TCP acceleration", in Comput. Commun. 32, Issue 4, March 2009, 691-702.

Another type of optimization can be instead applied to the case of TCP connection "re-establishment". In particular, when a connection is established a second time towards the same server, the client can include a TCP session cookie generated during the first connection establishment. Such cookie allows the client to perform a direct data sending to the server without performing a full three-way handshake. This approach is usually called TCP fast open (described in the above cited document "TCP Fast Open").

SUMMARY

In an embodiment, the present invention provides a method for acceleration of TCP connection establishment between a client and a server in a network. The method includes deploying at least one stateful switch with packet generation capabilities in the network, and configuring the at least one stateful switch to: receive a TCP SYN segment from the client; generate a sequence number in a manner coordinated with the server; answer, on behalf of the server, the TCP SYN segment received from the client with a corresponding SYN ACK segment containing the sequence number; forward the TCP SYN segment received from the client to the server; and act as a forwarding element for segments exchanged between the client and the server once a TCP connection is established such that no state relating to the TCP connection is held by the at least one stateful switch.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention improve and further develop methods and systems for acceleration of TCP connection establishment between a client and a server in a network in such a way that, by employing means that are readily implemented and operable with low effort, a significant shortening of the time required for TCP connection establishment is achieved.

In accordance with the invention, a method for acceleration of TCP connection establishment between a client and a server in a network is provided, wherein the method includes deploying at least one stateful switch with packet generation capabilities in said network, and configuring said at least one stateful switch to receive a TCP SYN segment from the client, to generate a sequence number in a manner coordinated with the server, to answer said TCP SYN segment, on behalf of the server, with a corresponding SYN ACK segment containing said sequence number, to forward said TCP SYN segment received from the client to the server, and to act as a mere forwarding element for segments exchanged between the client and the server once a TCP connection is established such that no state relating to the TCP connection is held by said at least one stateful switch.

Furthermore, in accordance with the invention, a system is provided for acceleration of TCP connection establishment between a client and a server in a network, the system comprising: at least one stateful switch with packet generation capabilities, including input/output ports, a state table, a finite state machine, FSM, table, and a feedback loop implemented between said state table and said FSM table, and a controller for programming rules into said state table and said FSM table of said at least one stateful switch, wherein said at least one stateful switch is configured to receive a TCP SYN segment from the client, to generate a sequence number in a manner coordinated with said server, to answer said TCP SYN segment, on behalf of the server, with a corresponding SYN ACK segment containing said sequence number, to forward said TCP SYN segment received from the client to the server, and to act as a mere forwarding element for segments exchanged between the client and the server once a TCP connection is established such that no state relating to the TCP connection is held by said at least one stateful switch.

Methods and systems according to various embodiments of the invention provide a significant shortening of a time required for TCP connection establishment by using intermediate stateful switches (e.g. stateful SDN switches) with in-switch packet generation capabilities that are configured to work as TCP handshake accelerators. According to embodiments, a state machine is configured for the handling of TCP's three-way handshake acceleration in the stateful switch. Specifically, these stateful switches are coordinated with TCP servers to perform early generation of SYN-ACK TCP segments. According to embodiments of the invention, the method/system lets a switch answer a TCP SYN segment with the corresponding SYN ACK, while the SYN is also forwarded to the final TCP destination server. The switch performs then two parallel TCP connection establishments, one with the client and the other with the server. In this context it is important to note that in accordance with the present invention the stateful switch is not handling internally the state for the full TCP connection. Instead, it just stores the minimal state required for the execution of the three-way handshake. Therefore it is possible that, once the TCP connection establishment is performed, the switch is configured to act as a 'normal' switch, i.e. it becomes just an intermediate forwarding element of the segments exchanged between the TCP client and the TCP server.

Accordingly, embodiments of the present invention accelerate TCP connection establishments without deploying full-fledged TCP proxies, but by using intermediate nodes which only keep state during the three-way handshake. Specifically, no state about the TCP connection is/has to be stored in the switch, and there is no involvement of the SDN switch in the TCP connection after the connection establishment. Furthermore, there is no need for buffers or for closing/opening TCP connections. According to embodiments the sequence number generation procedure is offloaded from a TCP server to a stateful (e.g. SDN) switch.

Embodiments of the invention relate to a method for the generation of a TCP SYN-ACK segment on behalf of a TCP server without proxying the TCP connection that include the steps of:

1) Deploying one or more SDN switches in the network. These switches need to support stateful forwarding and in-switch packet generation.
2) Configuring the switches to generate SYN-ACK packet.
3) Configuring the TCP servers to use the TCP sequence number generated by the switch.

Embodiments of the invention can be part of sophisticated SDN solutions, providing enhancements of both the SDN switches and the controller. In general, the invention can be used also in Telecom operators' deployments as an advance TCP acceleration service. In this sense, it may be part of a next generation SDN-enhanced TMS.

According to an embodiment the stateful switch, in order to answer a TCP SYN segment received from the client with a corresponding SYN ACK segment, may perform the steps of copying the TCP SYN segment received from the client in a new segment, including the generated sequence (acknowledgment) number into the new segment, and forwarding said new segment to the client. According to embodiments of the invention the switch may generate the SYN ACK segment according to the principles of in-switch packet generations.

According to an embodiment the stateful switch may be configured to communicate the generated sequence number to the server. For instance, in order to communicate the sequence number to the TCP server, the stateful switch may include the sequence number into a custom additional TCP option that is added to the TCP SYN segment received from the client, before forwarding the TCP SYN segment to the server. Alternatively, the stateful switch can encode the sequence number in a packet's header field.

An alternative way of how the server can gain knowledge of the sequence number generated by the stateful switch can be that the coordination between the server and the stateful switch includes a mechanism in which the server agrees with the stateful switch in a common scheme to generate the sequence number. In other words, the stateful switch generates the sequence number in cooperation with the server. For instance, in a straightforward implementation, the server and the stateful switch many agree, in advance, on a list of sequence numbers that are employed according to a specified order.

As already mentioned above, the stateful switch is in charge of generating the sequence number on behalf of the TCP server (and the TCP server has knowledge of this generated sequence number, either by virtue of the agreed generation scheme or by virtue of explicit information from the switch). Therefore, according to an embodiment, it may be provided that the server should use the sequence number generated by the stateful switch for the newly initiated TCP connection, i.e. for generating the server's SYN ACK segment. Typically, this embodiment requires agreement between the TCP servers and the stateful network switches that perform the acceleration.

Alternatively, the server may be allowed to use an arbitrary sequence number for generating the server's SYN ACK segment. In this case, it may be provided that the SDN switch is configured to perform a translation between sequence numbers (i.e. between this arbitrary sequence number and the sequence number generated by the SDN switch on behalf of the server) for all remaining segments exchanged by the client and the server in the respective TCP connection.

With respect to the sequence number generation by the SDN switch several different implementations may be realized. For instance, according to one embodiment the SDN switch may generate the sequence number by copying the sequence number from the TCP SYN segment received from the client. This implementation comes along with the advantage that the generated sequence number does not have to be communicated to the server separately since, in fact, the server can read it directly from the SYN packet.

According to alternative embodiments, the sequence number may by derived from a counter stored in the SDN switch, or it may be generated by an arbitrary algorithm the SDN switch executes. According to still another embodiment the sequence number may be determined by the packet template used for the generation. A will be easily appreciated by those skilled in the art, the above listing is not exhaustive, and further alternative ways of how the SDN switch generates the sequence number may be envisioned. In any case, however, the switch either communicates the generated sequence number to the server, or the server and the switch have agreed, in advance, on the respectively applied sequence number generation mechanism (such that the server is enabled to derive the sequence number from this generation mechanism).

The TCP server whose connection establishment procedure has been accelerated should be aware that the connection establishment underwent such process. In fact, for any received SYN from a TCP client, if the SYN triggered a SYN-ACK generation by any of the SDN stateful switches in the path, then it is advantageous that the server uses the sequence number generated by such switch. As mentioned earlier, the sequence number generation and communication-to-server procedures can happen in any of the previously described ways.

In case only a subset of the new TCP connection establishments received by the server has been actually accelerated, the server needs to be able to distinguish between TCP SYN segments for which a new sequence number has to be generated and for which this is not the case (since the new sequence number has already been generated by any of SDN stateful switches on the path between the TCP client and the TCP server. According to an embodiment this can straightforwardly happen by tagging the TCP SYN segment in case acceleration was provided, i.e. the SDN switch introduces a tag into the TCP SYN segment received from the client before forwarding them to the server. To this end, any known tagging technique may be employed.

Similar to the generation of the sequence number on behalf of the TCP server, the switch may use additional appropriate information for the SYN-ACK packet generation. Accordingly, according to an embodiment, the SDN controller may be configured to program the stateful SDN switch with respect to the admission or permission of TCP options for the SYN ACK packet generation. For instance, the programming may relate to adding (or not adding) the Kind 4 TCP option for selective acknowledgements permitted (as specified in IETF RFC 2018: "TCP Selective Acknowledgment Options", October 1996). This TCP option is only allowed in SYN packets and indicates that the sender is able to process Selective Acknowledgements. Whether to add the option can be programmed by the SDN controller depending on the requested server, or probed/learned by the switch from previous SYN-ACKs.

Additionally or alternatively, the programming may relate to adding (or not adding) the Kind 3 TCP option for window scaling (as specified in IETF RFC 7323: "TCP Extensions for High Performance", September 2014). This TCP option is required to have correct window scaling information in the SYN-ACK, i.e. matching the TCP Servers window scaling factor, as otherwise reliable TCP transfers are not ensured. Again whether to add the option can be programmed by the SDN controller depending on the requested server, or probed/learned by the switch from previous SYN-ACKs.

According to still another embodiment the programming may relate to adding (or not adding) the Kind 2 TCP option for maximum segment size announcements (as specified in IETF RFC 793: "TRANSMISSION CONTROL PROTOCOL—DARPA INTERNET PROGRAM PROTOCOL SPECIFICATION", September 1981). This option is used to inform the other side of the of the maximum TCP segment size that is expected to work well for the connection. This option is not crucial to have. Yet, again whether to add the option can be programmed by the SDN controller depending on the requested server, or probed/learned by the switch from previous SYN-ACKs.

Since embodiments of the present invention described hereinafter in detail rely on the concepts of Software-Defined Networking (SDN), OpenFlow and OpenState, for ease of understanding first some essential aspects of these concepts will be briefly summarized, while it is generally assumed that those skilled in the art are sufficiently familiar with the respective technologies.

The Software-Defined Networking (SDN) paradigm (as specified in https://www.opennetworking.org/images/stories/downloads/sdn-resources/technical-reports/TR_SDN-ARCH-Overview-1.1-11112014.02.pdf) brings a separation of packet forwarding (data plane) and the control plane functions.

Being widely adopted, the OpenFlow protocol provides flow-level abstractions for remote programming of a switch's data plane from a centralized controller. A controller instructs an underlying switch with per-flow rules by means of specific Flow_Mod messages. Such message contains match and action parts with the first specifying the packet headers to match and with the second applying a particular processing decision to all the packets belonging to the specified flow. These forwarding rules are translated into forwarding table statements and become installed into one or several forwarding tables of a table pipeline (for reference, cf. https://www.opennetworking.org/technical-communities/areas/specification)

Such forwarding abstraction implies stateless packet processing in the table pipeline, meaning that any possible state transitions of any particular flow may be implemented only on the controller's side. This means that any forwarding logic that needs stateful packet processing requires several interactions between the switch and the controller. Examples of stateful processing applications which may involve such interactions are: traffic anomalies detection, firewall-like primitives (e.g. reflexive ACL), adaptive QoS enforcement, etc.

Figure 1:
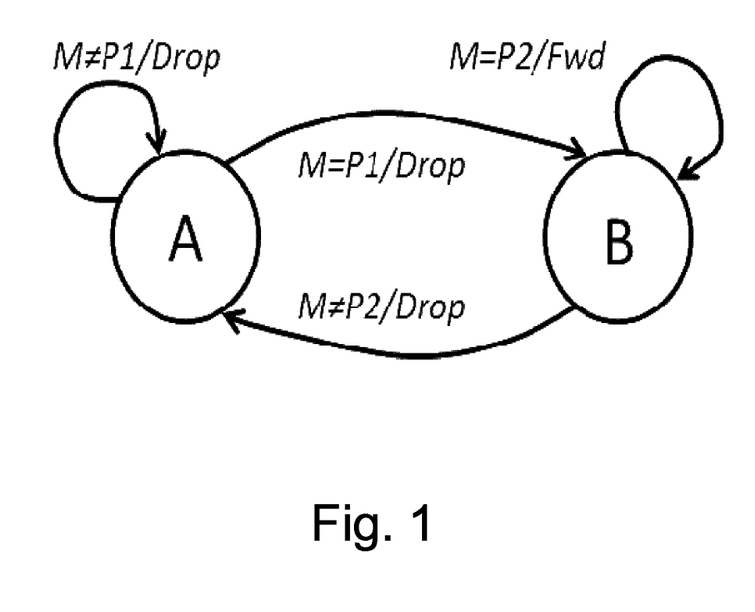
FIG. 1 is a schematic view illustrating a two-phase port knocking application FSM.
Figure 2:
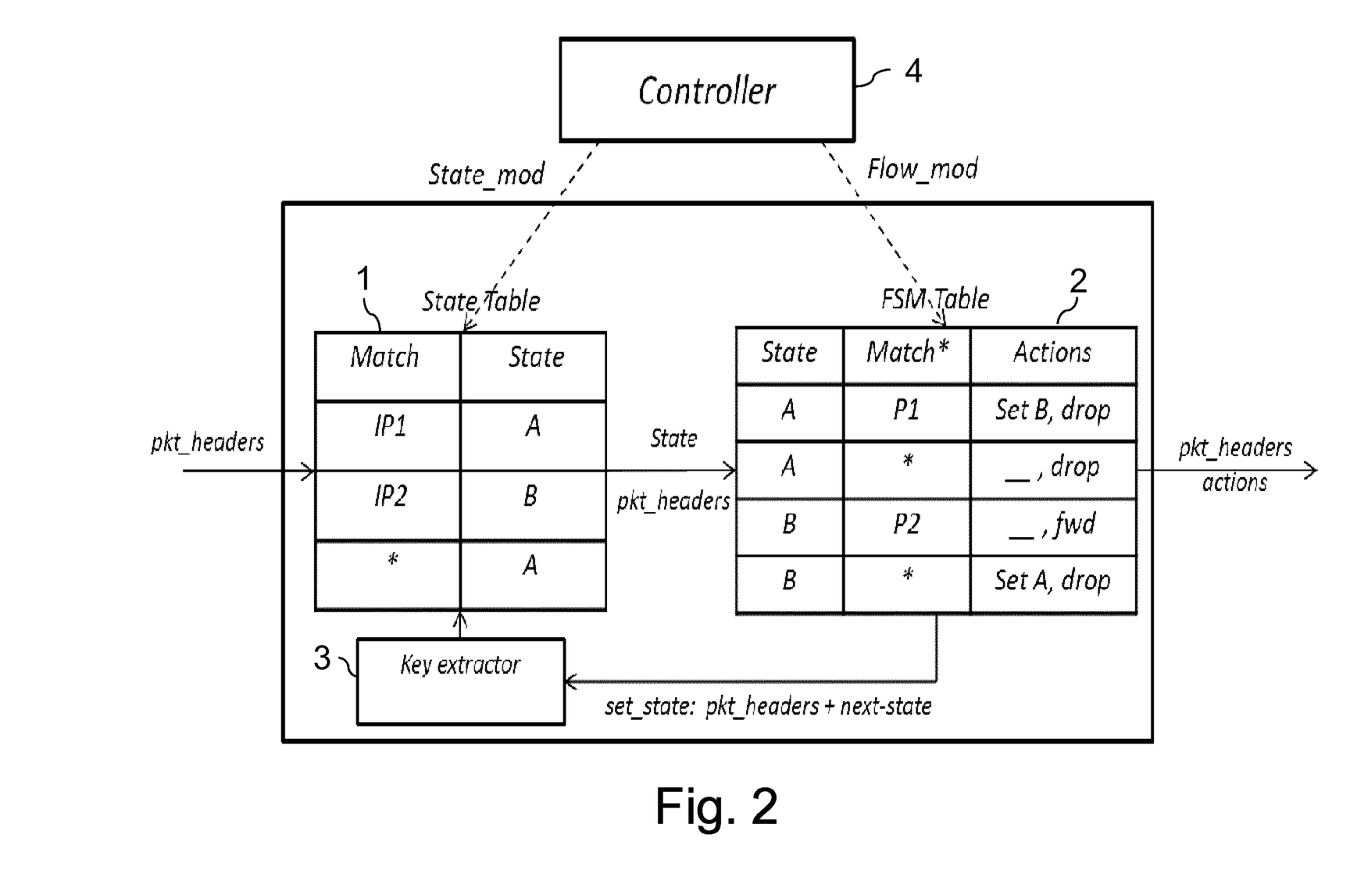
FIG. 2 is a schematic view illustrating a stateful switching architecture implementing the port knocking application of FIG. 1.

OpenState (as described, e.g., in Giuseppe Bianchi, Marco Bonola, Antonio Capone, and Carmelo Cascone: "OpenState: programming platform-independent stateful openflow applications inside the switch", in SIGCOMM Comput. Commun. Rev. 44, 2 (April 2014), 44-51) enables an extension to flow-oriented stateless processing which enhances forwarding engines with an eXtended Finite State Machine (XFSM). This extension allows to track the state of each flow in the switching pipeline and to perform transitions of this state by adding to the stateless forwarding architecture two tables: state table and XFSM table. FIGS. 1 and 2 illustrate this approach.

FIG. 1 schematically illustrates the concept of a stateful SDN (Software Defined Network) switch that provides an extension to flow-oriented stateless processing by means of implementing an FSM (Finite State Machine) table in addition to the state table. This extension allows to track the state of each flow in the switching pipeline and to perform transitions of this state.

Specifically, FIG. 1 represents an example of a simple stateful packet processing application known as "Port knocking" (for reference, see Giuseppe Bianchi, Marco Bonola, Antonio Capone, and Carmelo Cascone: "OpenState: Programming Platform-independent Stateful OpenFlow Applications Inside the Switch", in SIGCOMM Comput. Commun. Rev. 44, 2 (April 2014), 44-51). This application opens a transport port in the system for a particular remote host (e.g. TCP port for an SSH connection) after incoming flow's packets were destined to a predefined port sequence. If the port sequence matches a predefined one in the FSM (which in the illustrated example is the sequence of TCP destination ports=[P1, P2]), the connection moves from an established state (i.e. A/Drop) to another established state (i.e. B/Fwd), i.e. all the subsequent packets of the same connection are forwarded.

In detail, if the match M on port P1 fails, the respective packet is dropped and the system remains in state A. If this match is successful, the respective packet is still dropped, but the system performs a switch to state B. Once in state B, if a match on port P2 is successful, the system remains in state B and all subsequent packets of the respective connection are forwarded. As soon as the match on port P2 fails the respective packet is dropped, and the system returns to state A.

To compile the described logic, the switching pipeline needs to be modified as depicted in FIG. 2. Here, the state table 1 is the first of the two tables of the architecture. In this state table 1, which is a key-value first-match-lookup table, a first-match lookup is performed to match some packet header(s) of an incoming flow against the state associated with this flow. The records in the table 1 are ordered e.g. by means of OpenFlow priority attributes. For instance, in the port knocking example of FIG. 1, such a field may match against the source IP address of every remote host which initiates the connection. The lookup returns a value, which is a state associated with the incoming flow (host) or a default state value associated with the wildcard match (MATCH_ALL in OpenFlow terms). This state is then passed together with the corresponding packet headers to the second stage—the FSM table 2. The state transfer between the tables 1, 2 of a switching pipeline may be performed by using metadata fields.

In the FSM table 2, a combination of packet headers and the transferred state is a key for the next lookup. In this context it should be noted that match fields in the FSM table 2 (denoted 'Match*' in FIG. 2, as well as in all subsequent figures) are generally independent from the match field(s) in the state table 1 (denoted 'Match'). In the port knocking example, the match field in the FSM table 2 is the TCP destination port. Depending on the combination of the state and the Match* fields, actions for flow processing and its state update (if needed) are taken, which are in accordance with the FSM described in connection with FIG. 1. If a flow's state update is needed, a feedback loop becomes involved between the two tables 1, 2 passing a set_state: pkt_headers+next_state message with an update for a particular flow. A key extractor module 3 derives a particular value(s) for the match field(s) of the state table 1 from the packet headers and passes it together with next_state to the state table 1, thus either updating an existing record or installing a new one. The initial programming of both tables 1, 2 happens from the centralized controller 4 by means of State_mod and Flow_mod messages, as indicated by the dotted lines in FIG. 2. In this regard it should be noted that the state table 1 requires in this example only a single State_mod message with a default match/state decision (shown at the bottom of the state table), while all the subsequent updates happen through the feedback loop.

Figure 3:
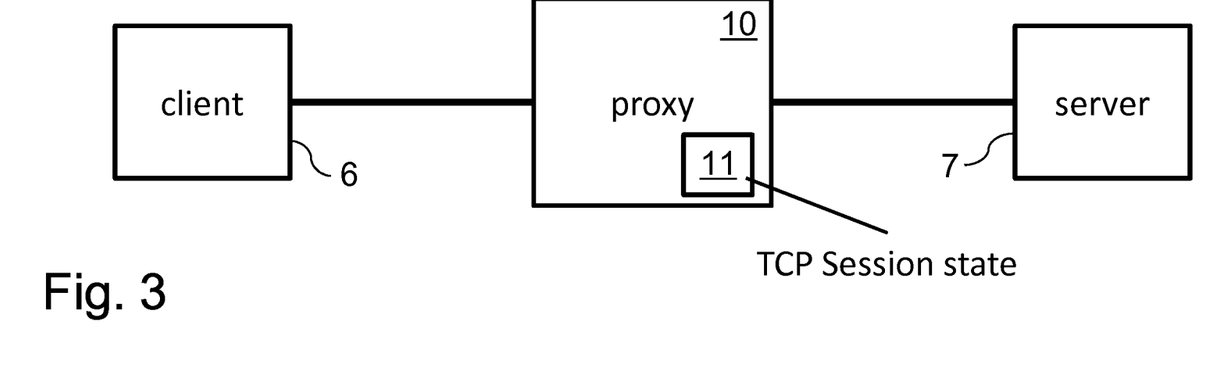
FIG. 3 is a schematic view illustrating TCP connection establishment acceleration using a TCP proxy according to the prior art.

FIG. 3 is a schematic view illustrating TCP connection establishment acceleration using a TCP proxy 10 according to the prior art. The TCP proxy 10 performs the three-way handshake initiated by the client 5, then, it initiates a three-way handshake with the server 7. In both cases, the TCP proxy 10 creates state associated with the connection, such as TCP's finite state machine tracking, timers, buffers, etc. Such state is represented with the box "TCP Session State" 11 in FIG. 3. Notice that the TCP Session State 11 is kept for the entire duration of the established TCP session.

Figure 4:
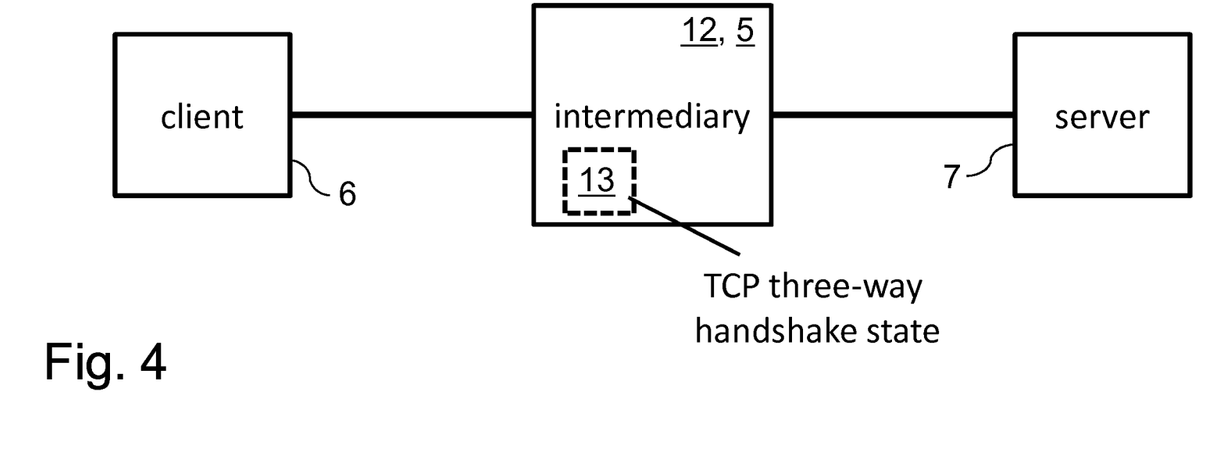
FIG. 4 is a schematic view illustrating TCP connection establishment acceleration in accordance with an embodiment of the present invention.

FIG. 4 is a schematic view illustrating TCP connection establishment acceleration using an embodiment of the present invention. Here, the intermediary box 12, e.g., a stateful SDN switch 5, performs the three-way handshake initiated by the client 6 and in parallel performs also a three-way handshake with the server 7. Given the described method, the intermediary 12 keeps the state only required for the conclusion of the three-way handshake with the client 6 and the server 7. This TCP three-way handshake state is denoted by reference number 13 in FIG. 4. Such state is minimal and mainly includes the TCP's finite state machine tracking for the connection establishment part. That is, it monitors the handling of the SYN, SYNACK, ACK TCP frames used by the three-way handshake, but e.g., no buffers are created and/or maintained. Notice that once the TCP session establishment is concluded, there is no state maintained in the intermediary 12 for the established TCP session, independently from the session duration.

Figure 5:
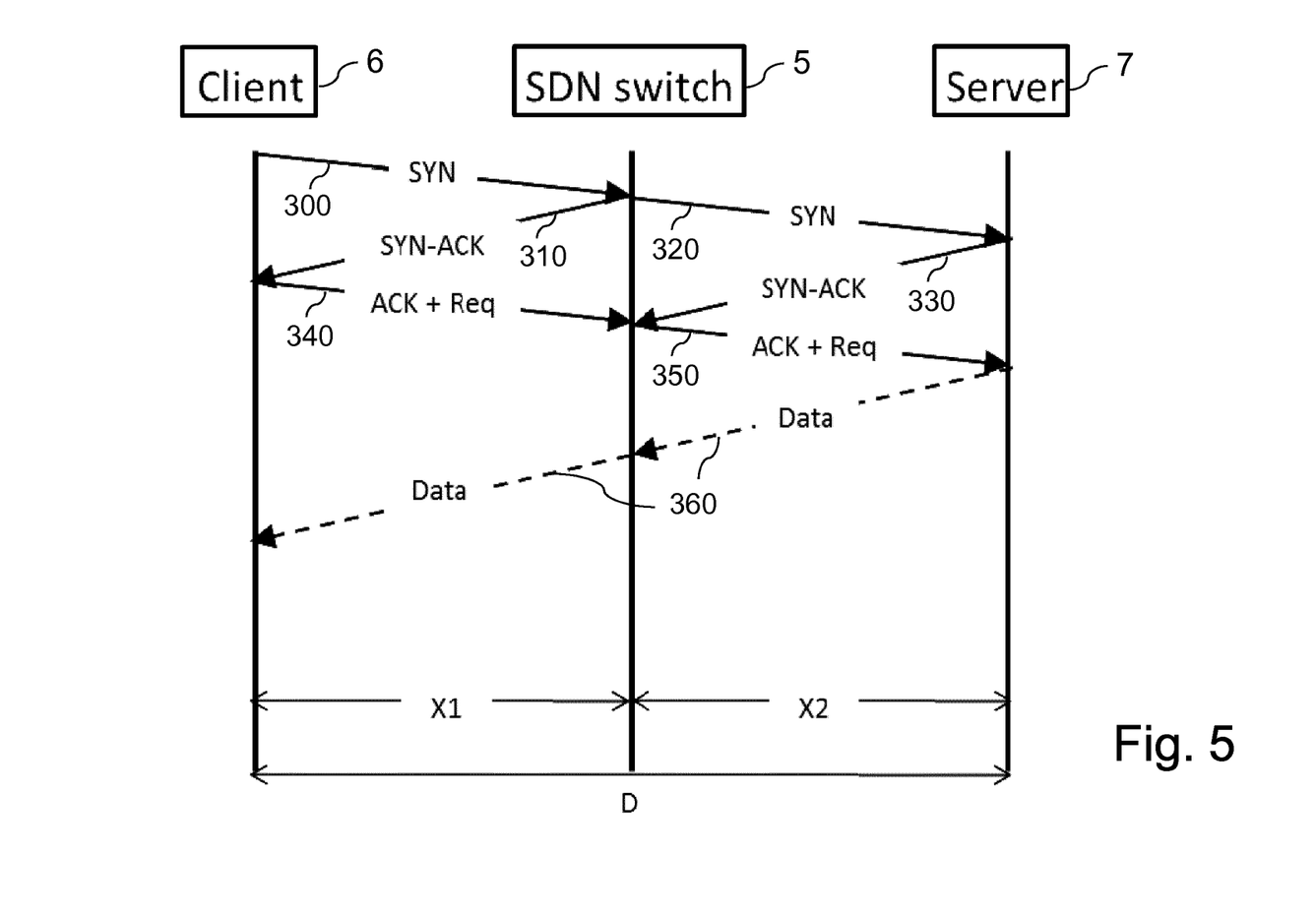
FIG. 5 is a diagram illustrating TCP connection establishment acceleration with an SDN switch that replies to TCP SYN segments in accordance with embodiments of the present invention.

Turning now to FIG. 5, this figure illustrates a message flow diagram of a TCP connection establishment accelerated with a SDN switch 5 in accordance with an embodiment of the present invention. The TCP connection is established between a client 6 and a server 7 with the SDN switch 5 in between, communicating both with the client 6 and the server 7.

In the illustrated embodiment the SDN switch 5 is assumed to be located such that the delay between the client 6 and the SDN switch 5 (denoted delay 'X1' in FIG. 5) is approximately of the same size as the delay between the SDN switch 5 and the server 7 (denoted delay 'X2'), i.e. $X1 \approx X2 \approx D/2$, where 'D' denotes the overall delay between the client 6 and the server 7. While this is the most favorable situation in terms of the amount of acceleration that can be achieved, the method can be applied likewise in situations with $X1 \neq X2$ (for instance, due to the fact that the SDN switch 5 is topologically closer to either the client 6 or the server 7), as will be easily appreciated by those skilled in the art.

Essentially, in the embodiment of FIG. 5 the SDN switch 5, which is a stateful SDN switch with packet generation capabilities, is configured to work as TCP connection establishment accelerator. The basic principle of the acceleration is to let the SDN switch 5 answer a TCP SYN segment with the corresponding SYN ACK, while the SYN is also forwarded to the final TCP destination server 7, as shown in FIG. 5. The SDN switch 5 performs then two parallel TCP connection establishments, one with the client 5 and the other with the server 7. Once the establishment is performed, the SDN switch 5 acts as a normal switch becoming just an intermediate forwarding element between the client 6 and the server 7.

In detail the procedure illustrated in FIG. 5 unfolds as follows: To initiate the TCP connection, as shown at step 300, the client 6 sends a TCP SYN segment. Upon reception of this TCP SYN segment, the SDN switch 5 performs the following actions: It generates a sequence (acknowledgement) number for the server side, as will be described in more detail below in connection with FIG. 6. Further, as shown at step 310, it responds to the client 6 with a TCP SYN ACK which includes the generated sequence number as acknowledgement number. Further, as shown at step 320, the SDN switch 5 forwards a TCP SYN to the server using the client's 6 sequence number (i.e. the sequence number contained in the client's 6 TCP SYN segment). Finally, the SDN switch 5 informs the server 7 about the generated sequence number the server 7 should use for the newly initiated TCP connection.

Next, as shown at step 330, the server 7 sends a SYN-ACK. According to an embodiment of the present invention, this step may be implemented as an optional step, i.e. it can be omitted. In cases, in which the server 7 is configured to send the SYN-ACK, the SDN switch 5 may simply drop this SYN-ACK.

Upon reception of the TCP SYN ACK from the SDN switch 5, the client 6 sends the ACK (and the first data segment), as shown at step 340. It is noted that in the illustrated embodiment the ACK is assumed to contain as first data segment a request for content, the message being correspondingly denoted 'ACK+Req'.

The SDN switch 5 forwards the ACK from the client 6 and any other TCP segment sent by the client 6 to the server 7, as illustrated at step 350.

With the exchange of the TCP ACK segment, the TCP handshake is completed, i.e. the TCP connection is successfully established. From now on, the SDN switch 5 becomes just a forwarder of the segments between the client 6 and the server 7, as exemplarily shown at step 360 for one data segment.

Figure 6:
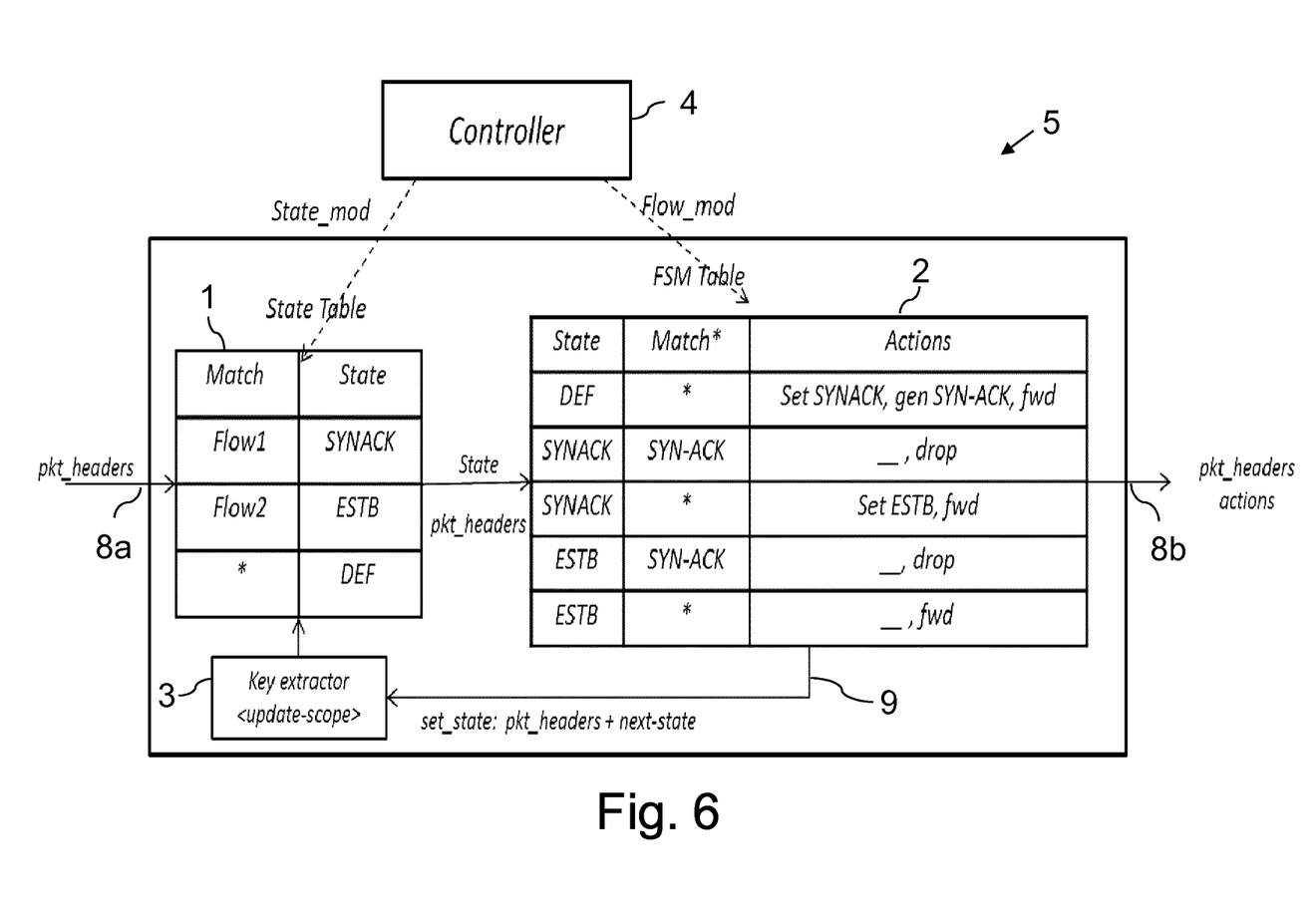
FIG. 6 is a schematic view illustrating an implementation of a TCP connection establishment acceleration proxy using an SDN stateful switch in accordance with an embodiment of the present invention.

FIG. 6, in which like numerals denote like components/elements as in the previous FIG. 2, is a schematic view illustrating an OpenState based SDN stateful switch 5 configured for deployment as a TCP connection establishment accelerator in accordance with embodiments of the present invention. The general assembly of this switch 5 (i.e. being composed of input/output ports 8a/b, a state table 1 and a FSM table 2, with the two tables 1, 2 being programmable by a controller 4, and a feedback loop 9 with key extractor module 3 implemented between the two tables 1, 2) is the same as that of the switch described above in connection with FIG. 2. However, the configuration/programming of the switch 5 is different, as will be described in detail hereinafter.

FIG. 6 is a snapshot showing the SDN switch 5 at a point in time where two flows, denoted Flow1 and Flow2, are assumed to being currently processed by the switch 5. Hence, these flows have corresponding flow table entries, FTEs, in the state table 1, with Flow1 having 'SYNACK' as its currently associated state and with Flow2 having 'ESTB' as its currently associated state. By default, the state table 1 contains another record, which has a wildcard match and its associated state is 'DEF'. As will become apparent from the following description, the state 'SYNACK' is generally used to handle flows during the TCP handshake procedure, the state 'ESTB' (referring to 'established') is generally used to handle flows after the TCP handshake procedure has been successfully terminated and the TCP connection is thus established, and the state 'DEF' (referring to 'default') is generally used to handle any new flows.

When a new flow, which has no associated fine-grained record in the state table 1, is received at the SDN switch 5, it will be handled by the default record and gets associated the state 'DEF'. Consequently, when transferred to the FSM table 2, the flow will be handled by the first entry of the FSM table 2, which contains a wildcard match. This is appropriate when it is assumed that only TCP SYN segments are directed to the SDN switch 5. In a configuration, however, where the SDN switch 5 may also receive other packets, the respective FSM table 2 entry may be designed to specifically match on SYN packets.

The first entry of the FSM table 2 indicates in its action field 'Set SYNACK, gen SYN-ACK, fwd'. Accordingly, in case of the reception of a new TCP SYN segment from a client 6 at the SDN switch 5, the following set of actions will be executed by the SDN switch 5:

First, by executing the 'Set SYNACK' action, the state for the corresponding flow will be switched from 'DEF' to 'SYNACK'. This happens by means of the feedback loop between the two tables 1, 2 passing a set_state: pkt_headers+next_state message and via key extractor module 3. As a result, a new record will be installed in state table 1 that associates the corresponding flow the state 'SYNACK'. Furthermore, the 'gen SYN-ACK' will be executed, which corresponds to an in-switch packet generation action and which will be described in detail below. Finally, execution of the action 'fwd' means that the TCP SYN segment is forwarded to the server 7, corresponding to step 320 of FIG. 5.

Turning now to the gen SYN-ACK action, this action comprises the following operations: First, the client's 6 TCP SYN segment is copied into a new segment S. Then, a sequence number for the server-side TCP connection is generated, and this generated sequence number is included into the new segment S. Finally, the new segment S is forwarded to the client 6.

Essentially, the gen SYNACK action corresponds to an in-switch packet generation (as described e.g. in Roberto Bifulco, Julien Boite, Mathieu Bouet, and Fabian Schneider: "Improving SDN with InSPired Switches", in Proceedings of the Symposium on SDN Research (SOSR '16). ACM, New York, N.Y., USA, Article 11). In this context, an In-Switch Packet generation (InSP) Application Programming Interface (API) allows the SDN controller 4 to program the autonomous generation of packets in the switch 5. The packet generation operation can be specified by providing three pieces of information: the trigger, the content and the actions. The trigger tells the switch 5 when a packet should be generated; the content specifies what are the packet's header and payload; the actions specify how the switch 5 should use the packet. An OpenFlow-based implementation of the API leverages the OpenFlow abstractions such as Flow Tables and Flow Table Entries (FTEs), and defines new ones for supporting the specification of the trigger, content and actions information. In particular, it defines a Packet Template Table to store the content of the packets that will be generated by the switch 5. Each Packet Template Table Entry (PTE) specifies the content of one packet and has a unique identifier that is used as a reference in other parts of the API. Second, the implementation adds a new OpenFlow instruction, the InSP instruction, that specifies the actions using standard OpenFlow actions. Finally, the trigger is provided by defining a FTE that contains the InSP instruction. In fact, the InSP instruction contains also a PTE's identifier that points to the corresponding PTE. Whenever a packet is matched by the FTE, the InSP instruction is triggered and the pointed PTE is used to generate the packet to which the instruction's actions are applied.

When the next packet of the respective flow arrives at the SDN switch 5, this packet will be associated with the state 'SYNACK' and will thus be handled by either the second or the third entry of FSM table 2. In case this packet is the SYNACK segment from the server 7 (cf. step 330 of FIG. 5), the second entry of FSM table 2 applies and the corresponding action is to simply drop this packet, as described above in connection with FIG. 5. On the other hand, if the next packet is the ACK segment sent by the client 6 (cf. step 340 of FIG. 5), the wildcard match of the third entry of FSM table 2 matches on this packet. Consequently, the corresponding action would be 'Set ESTB', i.e. to switch the state of the flow from 'SYNACK' to 'ESTB' (since after the reception of the ACK segment the TCP connection is established) and 'fwd', i.e. to forward the ACK segment to the server 7, corresponding to step 350 of FIG. 5.

All subsequent packets, upon arriving at the SDN switch 5, will be associated with the state 'ESTB' at the state table 1 and will therefore be handled by the fourth and/or fifth entry of FSM table 2. The fifth entry reflects step 360 of FIG. 5, i.e. the SDN switch 5 simply functions as an intermediate forwarding element between the client 6 and the switch 7. The fourth entry considers the situation in which the ACK from the client 6 is received at the SDN switch 5 before the SYNACK from the server 7 is received at the SDN switch 5. The entry ensures that the SYNACK from the server 7 is excluded from the general forwarding of packets to the client 6 and that this packet is dropped instead.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for acceleration of TCP connection establishment between a client and a server in a network, the method comprising:
   deploying at least one stateful switch with packet generation capabilities in the network, and
   configuring the at least one stateful switch to:
   receive a TCP SYN segment from the client,
   generate a sequence number in a manner coordinated with the server,
   answer, on behalf of the server, the TCP SYN segment received from the client with a corresponding SYN ACK segment containing the sequence number,
   forward the TCP SYN segment received from the client to the server, and
   act as a forwarding element for segments exchanged between the client and the server once a TCP connection is established such that no state relating to the TCP connection is held by the at least one stateful switch.

2. The method according to claim 1, wherein the at least one stateful switch, in order to answer the TCP SYN segment received from the client with the corresponding SYN ACK segment, copies the TCP SYN segment received from the client in a new segment, including said includes the generated sequence number in the new segment, and forwards the new segment to the client.

3. The method according to claim 1, wherein the server gains knowledge of the sequence number generated by the at least one stateful switch either by being informed by the at least one stateful switch about the generated sequence number or by agreeing with the at least one switch in a common scheme to generate the sequence number.

4. The method according to claim 1, wherein the server uses the sequence number generated by the at least one stateful switch for generating a server SYN ACK segment.

5. The method according to claim 1, wherein the server uses an arbitrary sequence number for generating a server's SYN ACK segment, and wherein the at least one stateful switch performs a translation between the arbitrary sequence number and the sequence number generated by the at least one stateful switch on behalf of the server.

6. The method according to claim 1, wherein the at least one stateful switch generates the sequence number by copying the sequence number from the TCP SYN segment received from the client.

7. The method according to claim 1, wherein the at least one stateful switch generates the sequence number by deriving it from a counter stored in the at least one stateful switch.

8. The method according to claim 1, wherein the at least one stateful switch generates the sequence number by executing an arbitrary algorithm, or wherein the sequence number is determined by a packet template used for the generation.

9. The method according to claim 1, wherein the at least one stateful switch introduces a tag into TCP SYN segments received from the client before forwarding them to the server.

10. The method according to claim 1, wherein the at least one stateful switch is a stateful SDN switch.

11. A system for acceleration of TCP connection establishment between a client and a server in a network, the system comprising:
- at least one stateful switch with packet generation capabilities, the at least one stateful switch including input/output ports, a state table, a finite state machine (FSM) table, and a feedback loop implemented between the state table and the FSM table, and
- a controller configured to program rules into the state table and the FSM table of the at least one stateful switch,
- wherein the at least one stateful switch is configured to:
  - receive a TCP SYN segment from the client,
  - generate a sequence number in a manner coordinated with the server,
  - answer the TCP SYN segment, on behalf of the server, with a corresponding SYN ACK segment containing the sequence number,
  - forward the TCP SYN segment received from the client to the server, and
  - act as a forwarding element for segments exchanged between the client and the server once a TCP connection is established such that no state relating to the TCP connection is held by the at least one stateful switch.

12. The system according to claim 11, wherein the at least one stateful switch, in order to answer the TCP SYN segment received from the client with the corresponding SYN ACK segment, is configured to:
- copy the TCP SYN segment received from the client in a new segment,
- include the generated sequence number into the new segment, and
- forward the new segment to the client.

13. The system according to claim 11, wherein the controller is configured to program the at least one stateful switch with respect to the admission or permission of TCP options for SYN ACK packet generation, including at least one TCP options for selective acknowledgment, window scaling, and/or maximum segment size announcements.

14. A stateful switch, configured to be employed in a method according to claim 1.

15. A controller, configured to be employed in a method according to claim 1.

* * * * *